United States Patent [19]

Kamody

[11] 4,170,550

[45] Oct. 9, 1979

[54] PROCESS FOR REDUCING AQUEOUS EFFLUENTS CONTAINING ENVIRONMENTALLY UNACCEPTABLE COMPOUNDS FROM A PROCESS FOR GASIFYING CARBONACEOUS MATERIALS

[75] Inventor: John F. Kamody, Irwin, Pa.

[73] Assignee: Koppers Company, Inc., Pittsburgh, Pa.

[21] Appl. No.: 891,686

[22] Filed: Mar. 30, 1978

[51] Int. Cl.² .............................................. B01D 13/00
[52] U.S. Cl. ................................ 210/23 H; 210/63 Z; 210/71; 210/73 R; 210/60; 210/DIG. 31; 48/210
[58] Field of Search ...................... 48/197 R, 202, 206, 48/210; 55/89; 252/373; 210/59, 60, 73 R, 23 H, 63 R, 321, 71, 63 Z, DIG. 31, 74, 70

[56] References Cited

U.S. PATENT DOCUMENTS

| | | | |
|---|---|---|---|
| 3,575,854 | 4/1971 | Richards | 210/50 |
| 3,902,547 | 11/1975 | Garrison et al. | 210/DIG. 31 |
| 3,966,633 | 6/1976 | Friedman | 48/202 |
| 3,971,637 | 7/1976 | Matthews | 252/373 |
| 4,000,065 | 12/1976 | Ladha et al. | 210/23 H |
| 4,105,545 | 8/1978 | Muller et al. | 210/DIG. 31 |

FOREIGN PATENT DOCUMENTS

| | | | |
|---|---|---|---|
| 1929254 | 12/1970 | Fed. Rep. of Germany | 210/63 Z |
| 394322 | 12/1973 | U.S.S.R. | 210/63 Z |
| 469667 | 11/1975 | U.S.S.R. | 210/63 Z |

*Primary Examiner*—Benoît Castel
*Attorney, Agent, or Firm*—Herbert J. Zeh, Jr.; Oscar B. Brumback

[57] ABSTRACT

Aqueous effluents from a process for gasifying carbonaceous materials may contain environmentally unacceptable compounds like hydrogen cyanide, ammonia, and compounds thereof, and dissolved salts and compounds of heavy metals and sulfur compounds. These compounds are removed from the aqueous effluents of the process for gasifying carbonaceous materials by recycling the aqueous effluents to the gasifier wherein the compounds are oxidized, reduced, or decomposed into environmentally innocuous compounds that can be released to the atmosphere or removed from the gasification process in the residue.

4 Claims, 2 Drawing Figures

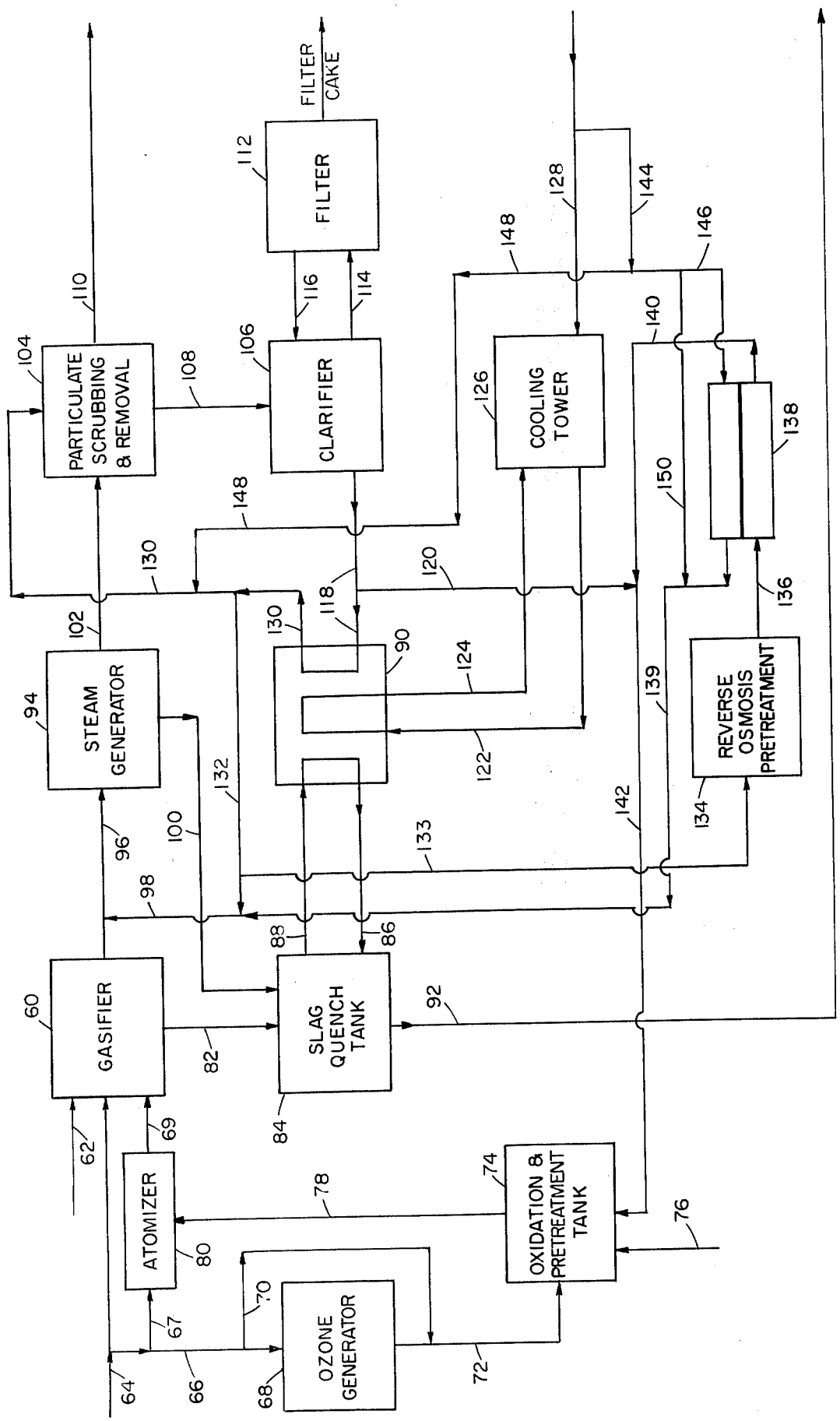

PROCESS FOR REDUCING AQUEOUS EFFLUENTS CONTAINING ENVIRONMENTALLY UNACCEPTABLE COMPOUNDS FROM A PROCESS FOR GASIFYING CARBONACEOUS MATERIALS

BACKGROUND OF THE INVENTION

This invention is directed to a process for reducing the emmissions of environmentally unacceptable compounds from a process for gasifying carbonaceous materials. More particularly, this invention is directed to a process for eliminating or minimizing the amount of ammonia, hydrogen cyanide, and heavy metals, and compounds thereof, heretofore obtained within waste aqueous effluents upon gasifying carbonaceous materials.

Gasification of a carbonaceous material involves reacting it at elevated temperature with air, oxygen, steam, carbon dioxide or various mixtures of such gasifying agents. The typical gasification process produces a gas leaving the gasifier that contains mostly carbon monoxide and hydrogen along with other gases such as carbon dioxide and methane, and distillation products such as tars, as well as carbon and ash. The material entrained with the gas, such as carbon and ash and other particles, are removed usually by a combination of cyclones or centrifugal separators, or a water scrubbing system using washer coolers, venturi scrubbers, or irrigated type electrostatic precipitators or combinations of these systems.

The raw gas from the gasifier contains, in addition to the aforementioned materials, sulfurous gases, such as hydrogen sulfide and carbonyl sulfide, and in addition contains small amounts of ammonia and hydrogen cyanide. Also, the particulates and tars which accompany the gas out of the gasifier may contain compounds of heavy metals such as mercury, zinc, or chromium, which must be properly considered from an environmental standpoint. It is believed that ammonia and hydrogen cyanide are generated predominantly by pyrolysis of nitrogen compounds present in the carbonaceous materials. The heavy metals are present since they are originally present by nature in the carbonaceous material. Since the sulfurous gases, hydrogen cyanide and ammonia, are soluble in water, these compounds are picked up by the water used in the water scrubbers which contact the raw gas in order to remove entrained particulates. As a result, these compounds appear as dissolved gases or chemical compounds in the effluent water from the water scrubbers. Also, the heavy metal compounds may be partially dissolved in ionic form within the effluent water from the water scrubbers.

To accommodate the heat load associated in cleaning the gas, aqueous foul effluent water from the water scrubbers is usually conveyed to a cooling tower where the foul water is cooled by direct evaporation of water to the atmosphere. During this cooling some of the noxious compounds, such as hydrogen sulfide, hydrogen cyanide, and ammonia, that were in the foul effluent water are discharged to the atmosphere. Furthermore, as these gases are stripped from the water in the cooling tower, there is a thermodynamic tendency for even more sulfurous gases, ammonia, and hydrogen cyanide to be absorbed in the water which leaves the cooling tower and is recirculated to the water scrubbers in the gasification process. In addition, dissolved salts from any makeup water that is added to the system and from salts that leach from the carbonaceous fuel or ash will accumulate in the scrubbing water and must be removed by a blowdown stream. The blowdown stream, which is essentially a bleed-off stream, must be treated to remove or render innocuous such compounds as sulfur, ammonia, hydrogen cyanide, as well as heavy metals and salts and compounds thereof that may be contained in the blowdown water.

Methods known in the art for treating aqueous effluents containing ammonia and hydrogen cyanide and compounds thereof are complex and expensive. A common method, known as "breakpoint chlorination," involves purchase of considerable quantities of chlorine or sodium hypochlorite and additional compounds, such as liquid sulfur dioxide, acids and bases. Although such treatments usually permit compliance with current environmental regulations, the treatments produce a treated water that still contains some residual quantities of sulfur, ammonia, hydrogen cyanide and the disolved compounds of the heavy metals. Thus, even the most modern treatment procedures might not achieve an effluent stream which meets the practice encouraged by the U.S. Environmental Protection Agency of maintaining "zero effluents" from process equipment.

It has recently been suggested that the foul effluent water containing the environmentally unacceptable compounds be indirectly cooled to avoid its conveyance to the cooling tower for atmospheric exposure and to thereby eliminate discharge of sulfurous gases, ammonia, and hydrogen cyanide to the atmosphere. The indirect cooling improvement has the inherent disadvantage that an excess of water is produced by condensation of water vapor during the cooling and cleaning operation of the raw gas. This excess water would be contaminated with sulfur, ammonia, and hydrogen cyanide compounds and compounds of heavy metals, and with certain gasification processes, tars may be additionally present. In a gasification process there exists no practical means of removing the excess water from the process. This occurs because steam is heretofore used as a gasifying agent, and, in addition, water is often unavoidably present in the carbonaceous feed, or alternatively in certain instances water may chemically form from oxidation of a portion of the hydrogen present by nature in the carbonaceous feed. It is not practical to separately revaporize the excess water due to the cost and energy intensity and extensive softening that would be required for even a partial revaporization.

Also, in the past various effluents from chemical processes have been disposed of within an incineration process. It would not be environmentally acceptable to dispose of foul effluent water containing ammonia and/or cyanide in this manner. The ammonia and cyanide based compounds, upon incineration, would be largely converted to oxides of nitrogen and these oxides would be released to the atmosphere. These oxides of nitrogen are becoming of increasing concern with respect to adverse environmental impact.

It is the object of the present invention to provide a process for eliminating or reducing from a gasification process the quantities of aqueous effluents containing ammonia, hydrogen cyanide, heavy metals and compounds thereof, plus any sulfur compounds without reducing the efficiency of the process for gasifying carbonaceous materials. It is an additional object of the present invention to provide a process which prevents salts from accumulating in the scrubbing system for raw gas produced in a gasifier and which does not allow foul aqueous effluent from water scrubbers used to clean and to cool the raw gas from a gasifier for carbonaceous materials to contaminate other process waters used in the process for gasifying carbonaceous materials. It is an additional object of the present invention to dispose of the ammonia and cyanide based compounds present in the aqueous effluent from the cleaning and cooling of raw gas produced by the gasification of carbonaceous materials without largely converting the nitrogen contained in such compounds to oxides of nitrogen which would pollute the atmosphere.

It is a further object of the present invention to provide a process for preventing the accumulation of ammonia, hydrogen cyanide, and compounds thereof, and heavy metals and salts and compounds thereof, and sulfur compounds in an aqueous stream which is recirculated to scrub and cool raw gas from a gasifier for carbonaceous materials.

SUMMARY OF THE INVENTION

The present invention in its broadest aspect provides for recycling to the gasifier the foul aqueous effluent obtained from contacting the raw gas from a gasifier for carbonaceous materials with an aqueous solution to cool the gas, and to remove particulate material from the raw gas. This recycling renders environmentally innocuous a major amount of the ammonia, hydrogen cyanide, compounds thereof, and salts and compounds of heavy metals, and sulfur compounds present in the foul aqueous effluent.

In the gasifier the ammonia, hydrogen cyanide and compounds thereof, and sulfur compounds contained in the foul aqueous effluent are oxidized, decomposed and/or chemically reduced to environmentally innocuous gases. Thermally stable compounds or salts, such as those containing heavy metals, are removed principally with the residue recovered from the gasifier. The innocuous gaseous compounds are ultimately removed from the gasification process with the particle-free raw gas. The sulfur-bearing gases generated from the recycled foul aqueous effluent can be removed from the particle-free gas by any typical process for removing sulfur compounds from a gas.

The amount of foul aqueous effluent recycled to the gasifier is that amount which is about equal to the excess water generated on a net basis from the scrubbing and removal of particulate material from the raw gasifier gas and from any further cooling of the gas. Recycling this amount of foul aqueous effluent replaces or reduces the use of steam, water, or carbon dioxide supplied to the gasifier as a gasification agent for the gasification of carbonaceous materials. Using the foul aqueous effluent in lieu of steam as a gasification agent increases the output of useful gas from the gasifier and eliminates the need to provide external energy for the generation of process steam. The process of the present invention results in a much improved environmental situation without sacrificing any efficiency of the gasification process.

The process of the present invention in the aspect of its preferred embodiment involves a gasification process that operates at a high temperature when the carbonaceous material is gasified with oxygen and an additional gasification agent, usually steam. The reduction of the aqueous effluent containing ammonia, hydrogen cyanide, compounds thereof, heavy metals and compounds thereof, and sulfur compounds from the gasification process is best performed with the use of indirect cooling of the foul aqueous effluent and atomization of the recycled foul aqueous effluent into the gasifier. The atomization may be mechanical or may be with a portion of the oxygen which is usually fed to the gasifier to effect gasification of the carbonaceous material. Also, for best performance to maximize the results obtained, the process waters used for washing the raw gas to scrub and to remove particulates, and the process waters used for quenching the molten slag from the gasifier, are separated so the foul aqueous effluent does not contaminate the processing water used to quench the slag. This assures that water which accompanies the disposed slag contains a minimum of environmentally unacceptable compounds or dissolved gases. In addition, the preferred embodiment of the present invention can feature a solids concentration step, such as reverse osmosis, to keep dissolved solids from excessively accumulating in the raw gas cleaning and cooling system whereby the dissolved solids so concentrated are combined with the recycled aqueous effluent so that the solids may be ultimately trapped within the slag removed from the process. These dissolved solids unavoidably enter the raw gas scrubbing and cooling system as a result of leaching of a small amount of soluble materials, such as calcium chloride, from the ash of the carbonaceous fuel. In addition, the preferred embodiment of the present invention can feature pretreatment of the recycled aqueous effluent to facilitate the decomposition of contained compounds. An example of such pretreatment would involve adding lime to the recycled aqueous effluent prior to its introduction to the gasifier to thereby decompose contained ammonium chloride, which is ordinarily one of the major ammonia-based compounds present in the foul aqueous effluent. Gases which are evolved upon pretreatment would enter the gasifier along with the recycled aqueous effluent. An additional example of pretreatment would involve contacting the recycled aqueous effluent, prior to its introduction to the gasifier, with a portion of the oxygen used for gasification or with ozone, which can be readily made from available oxygen, thereby to effect some preoxidation of compounds contained in the aqueous effluent.

In the description and claims of the present invention the phrase "foul aqueous effluent" refers to the effluent obtained when the raw gas from the gasifier is scrubbed and cooled by being contacted with an aqueous solution. The aqueous solution used to clean and cool the raw gas is that portion of the foul aqueous effluent that is not recycled to the gasifier. The reference to the cleaning and cooling system or circuit means the cleaning and cooling and obtaining of the effluent and recirculating of a portion of the effluent to scrub and clean additional quantities of raw gas. The cleaning is to remove particulate materials from the raw gas and the cooling is to decrease the temperature of the raw gas to make it suitable for further processing.

In the process of this invention the term "environmentally innocuous" refers to compounds that are not hazardous to the environment and are not primary products of the gasification process.

DESCRIPTION OF THE DRAWINGS

FIG. 2 is a schematic flow sheet of a preferred embodiment of the present invention.

DESCRIPTION OF INVENTION IN ITS BROADEST ASPECTS

Figure 1:
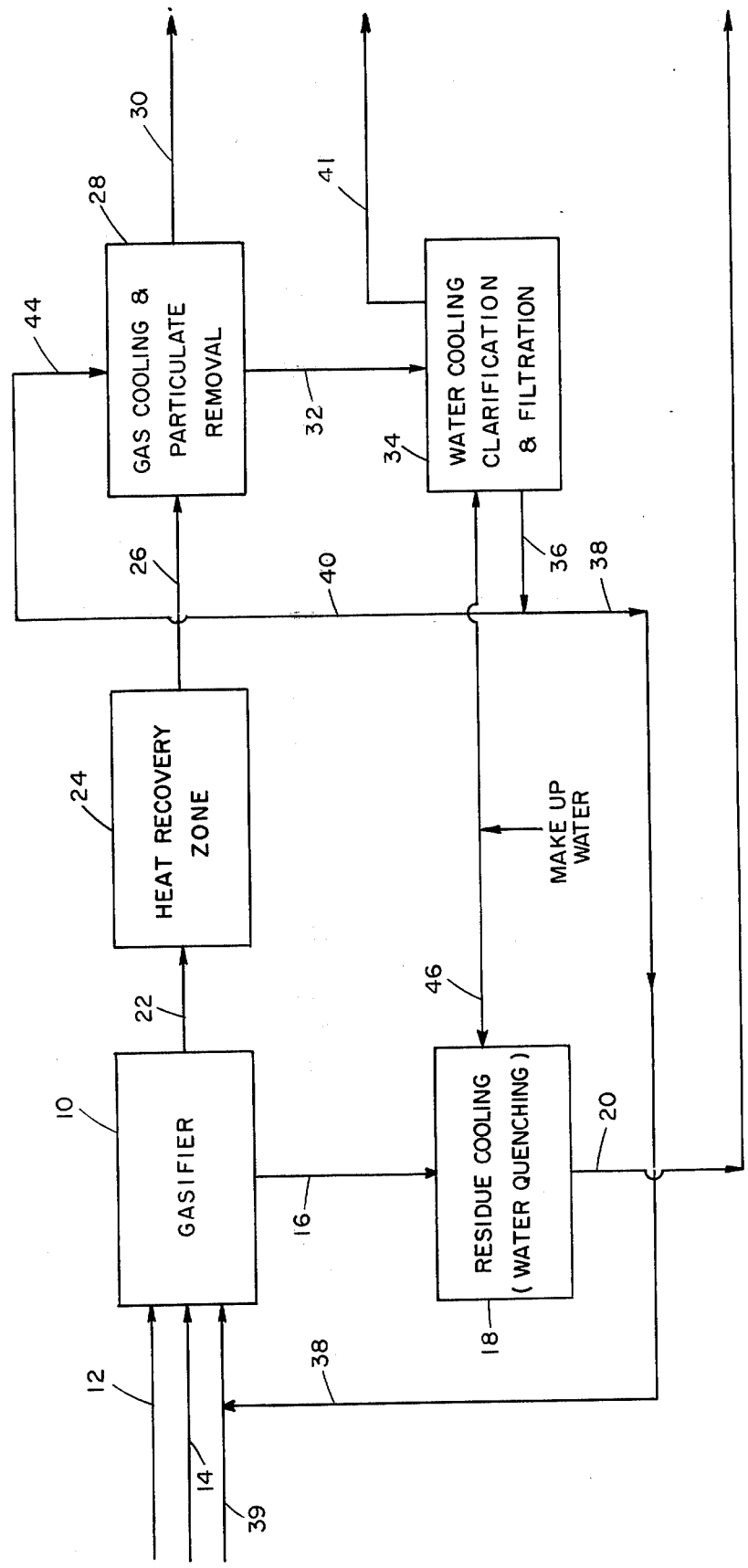
FIG. 1 is a schematic flow sheet illustrating the process of the invention in its broadest aspects.

Referring to FIG. 1 of the drawings, the process of the present invention is illustrated in its broadest aspects. Numeral 10 designates a gasification zone wherein carbonaceous material, which is introduced into the gasifier by conduit 12, is heated and simultaneously reacted with oxygen or air, which is introduced into the gasifier by conduit 14.

The carbonaceous material suitable for practice in the gasification process of the present invention include anthracites, sub-anthracites, bituminous coal, sub-bituminous coal, lignites, and coke made from these fuels. Cokes made from petroleum, coal tars, pitches, bitumens, carbonaceous matter from tar sands or oil shales, Gilsonite, Kerogens, and the like, are also suitable. The carbonaceous material has been prepared as necessary for the gasification. If it is a solid, the carbonaceous material is prepared by crushing it to the desired top size, removing fines and extraneous material, if necessary, and drying the coal, if necessary, for subsequent processing steps. If the carbonaceous material is a coking carbonaceous material, and if the process cannot operate with such a material, then the material is pretreated with heat to inhibit its coking tendencies. The carbonaceous material may be devolatilized or distilled either in the gasifier or in a separate vessel before it is reacted with the air or oxygen and the recycled foul aqueous effluent. The heating of the carbonaceous material in the gasifier 10 may be accomplished by internal heating as a result of chemical reaction or external heating, and the method of contacting the carbonaceous material with the oxygen or air and recycled foul aqueous effluent may be in a fixed bed, fluidized bed, or entrainment in the gasifying media of oxygen or air and recycled aqueous effluent. Also, the contacting of the reactants may be in a co-current or countercurrent fashion. The carbonaceous material is reacted with the gasifying media and with the recycled foul aqueous effluent from the scrubbing and cooling circuit, where the raw gas is scrubbed of particulate material and cooled. The recycled foul aqueous effluent is introduced into the gasifier by conduit 38 and replaces or diminishes the use of the gasification agents which would be introduced to the gasifier through conduit 39. Such a gasification agent would ordinarily be steam, but could also be another suitable fluid, such as carbon dioxide, which reacts endothermically in the gasification process. The amount of recycled foul aqueous effluent conveyed to the gasifier is that amount ordinarily equal to the amount of excess water generated by indirect condensation of water vapor from the raw gas during particulate removal or during any further processing of the raw gas, such as further cooling or compression.

The residue produced in gasifier 10 may be a slagging residue, which means that the residue is liquid ash, or non-slagging, which means that it is dry ash. The residue is removed from the gasifier 10 by conduit 16 and delivered to Residue Quench Tank 18 wherein the hot residue is solidified or cooled by direct contact with water. Heat associated with solidifying or cooling of the residue is removed indirectly by a variety of methods, not shown in FIG. 1, for example, the use of cooling coils within the Residue Quench Tank 18. The cooled residue is removed from the quench tank by conduit 20 and is conveyed to a residue disposal area, not shown in FIG. 1. As this residue is removed, the residue will contain, usually, 10 to 15 percent by weight of surface water. To compensate for this loss, make-up water is added through conduit 46.

In the typical gasification process for carbonaceous materials, the gas leaving the gasifier contains predominantly carbon monoxide and hydrogen with lesser amounts of water vapor, carbon dioxide, methane, nitrogen, argon, hydrogen sulfide and carbonyl sulfide, and has entrained in the gas residue ash, unreacted carbonaceous material, and tars. The raw gas from the gasifier containing these components is removed from the gasifier 10 by conduit 22 and is usually conveyed to a heat recovery zone. In the Heat Recovery Zone 24 the heat contained in the raw gas is used to generate steam that can be used in other steps of the process. The raw gas is then removed from the heat recovery zone by conduit 26 and delivered to Gas Cooling and Particulate Removal Zone 28. Here the raw gas is washed with an aqueous stream containing predominantly water, with some impurities, to remove the entrained material, i.e., ash, unreacted carbonaceous material, and other particulates that are in the raw gas. The particulate removal zone is usually composed of a combination of centrifugal separators and water scrubbers, but may consist of washer coolers, venturi scrubbers, or irrigated type electrostatic precipitators or combinations of these. The aqueous stream is recirculated and is delivered to Zone 28 by conduit 44. After the entrained material has been removed from the raw gas, the raw gas is conveyed from zone 28 via conduit 30 to be further processed, for example, compression followed by removing carbon dioxide and sulfur compounds (not shown in FIG. 1) and, further, to produce a synthesis gas or to be methanated to produce a pipeline quality gas. The ash, ungasified carbonaceous material, and other particles removed from the raw gas are carried out in suspension with the aqueous effluent stream used to remove these entrained materials from the raw gas, and are conveyed by conduit 32 to Water Cooling, Clarification and Filtration Zone 34.

The aqueous stream in conduit 32 contains ammonia, hydrogen cyanide, dissolved salts including heavy metals such as zinc, chromium and mercury, and compounds thereof, and some sulfur compounds. These materials are present in the foul aqueous effluent since small amounts of ammonia, hydrogen cyanide, and some sulfur compounds are present in the raw gas coming from the gasifier.

In addition, salts, including salts containing heavy metals, appear in the water as a result of leaching of these materials from ash which directly contacts the water. It is believed that generation of the ammonia and hydrogen cyanide and compounds thereof result from pyrolysis of nitrogen compounds present by nature in the carbonaceous material. On a nitrogen basis, ammonia and hydrogen cyanide represent usually no more than 10 percent of the nitrogen in the carbonaceous feed. The remaining amount of nitrogen in the carbonaceous feed is converted to gaseous nitrogen upon reaction within the gasifier. These nitrogen-containing compounds, such as ammonia and hydrogen cyanide, are not completely oxidized, decomposed, or reduced to environmentally innocuous compounds such as nitrogen, water, carbon dioxide, carbon monoxide or hydrogen before the gases leave the gasifier because there is insufficient residence time of the raw gas in the gasifier and because of other considerations, such as gasification temperature and pressure. In a typical gasification process, ammonia and hydrogen cyanide may be present at 1000 and 350 parts per million, by volume, respectively. However, computations have shown that, upon attainment of gas equilibrium within the gasifier, the concentrations of these gases should be about 1 part per million, or less. This supports the observation that insufficient residence time is available for complete oxidation, decomposition, or reduction of these gases. Furthermore, once the gas leaves the gasification flame area there is insufficient oxygen available for further oxidation of ammonia and hydrogen cyanide and other environmentally noxious compounds contained in the raw gases. Since hydrogen cyanide and ammonia and most compounds derived from them are soluble in water, and heavy metals may form chemical compounds which are soluble in water, these compounds appear as dissolved gases or chemical compounds within the foul aqueous effluent from the Gas Cooling and Particulate Removal Zone where the raw gas is cooled and cleaned.

In Water Cooling, Clarification and Filtration Zone 34 the solid entrained materials such as ash, ungasified carbonaceous material, and other particles are physically removed, usually by gravity settling, from the foul aqueous effluent and these concentrated solids are conveyed to a filter. As the raw gas is processed in Zone 28, heat must be removed from the gas to prevent water temperatures from becoming excessive and, furthermore, to keep the particulate-free gas conveyed by conduit 30 sufficiently cool and free of water vapor to favor further processing. Most of this heat is associated with latent heat involved in condensing water vapor from the gas. This heat is removed indirectly, for example, by contacting the raw gas with cooling coils in which clean cooling water is circulated. Alternatively, the water which leaves Zone 28 by conduit 32 may be passed across cooling coils or across a heat exchange surface in which the water is indirectly contacted with a forced draft of air.

As the raw gas is cooled during particulate removal, an excess of water results upon condensation of water vapor from the raw gas. Some of this excess water may leave with particulates, conveyed by conduit 41 from Zone 34, or with the residue conveyed by conduit 20 from Zone 18. However, the excess water which so leaves the process with the particulates and residue is only a portion of the total excess water, and will typically range from about 10 to about 50 percent of the total excess water. Heretofore the remaining amount of excess water not removed with the particulates or residue would be removed from either Zone 28 or Zone 34 and sent to effluent treatment facilities for ultimate disposal. According to the present invention the remaining amount of excess water is present in foul aqueous effluent that is recycled to the gasifier.

The clarified, i.e., particulate-free, foul aqueous effluent is conveyed from Zone 34 by conduit 36. A portion of the foul aqueous effluent conveyed by conduit 36 is recycled to the gasifier by conduit 38 while the remaining foul aqueous effluent is recirculated by conduit 40 to Gas Cooling and Particulate Removal Zone 28 to cool and clean more raw gas. The recycled foul aqueous effluent conveyed by conduit 38 represents the net excess water generated in the process. Further processing of the particulate-free raw gas can result in additional excess water as a result of additional condensation of water vapor from the gas. Such additional water could be obtained, for example, by compressing the gas with the use of intercooling or aftercooling of the gas processed through the compressor casings. This additional excess water could also be combined (not shown on FIG. 1) with the aqueous effluent recycled to the gasifier by conduit 38. This additional excess water can contain dissolved noxious gases which heretofore required treatment.

The amount of foul aqueous effluent recycled to the gasifier is also limited by the efficient operation of the gasifier. The amount of recycle foul aqueous effluent cannot be of such an amount as not to impair substantially the energy efficiency of the gasification process. The amount of foul aqueous effluent added to the gasifier cannot be such as to harm substantially gasifier efficiency in that heat otherwise available for endothermic reactions within the gasifier would be wasted in overcoming the additional latent heat of vaporization of the foul aqueous effluent.

Before the recycled foul aqueous effluent is introduced into the gasifier, it may be preheated to a temperature of around 700° F. (371° C.). Also, some water may be evaporated from the foul aqueous effluent before introduction into the gasifier. However, preheating or evaporation should not leave behind a solution which will crystallize solids on the walls of any confining vessel.

The recycled foul aqueous effluent is introduced into gasifier 10 wherein hydrogen cyanide, ammonia, and compounds derived from or containing these compounds, and any sulfur compounds are oxidized, decomposed or reduced to environmentally innocuous compounds. These innocuous compounds consist of hydrogen, water, carbon dioxide, carbon monoxide and hydrogen which can leave the gasifier in the raw gas and eventually by utilized for further processing or be released to the atmosphere without any adverse effects. Non-exclusive examples of such oxidation, decomposition, or reduction reactions are as follows:

Complete Oxidation $2NH_3 + 3/2\ O_2 \rightarrow N_2 + 3H_2O$ $2HCN + 5/2\ O_2 \rightarrow 2CO_2 + H_2O + N_2$

Incomplete Oxidation $2NH_3 + 5/2\ O_2 \rightarrow 2NO + 3H_2O$ $2HCN + 5/2\ O_2 \rightarrow 2CO + H_2O + 2NO$

Decomposition $2NH_3 \rightarrow N_2 + 3H_2$ $2HCN \rightarrow 2C + H_2 + N_2$

Reduction of Incomplete Oxidation Products $2NO + 2H_2 \rightarrow 2H_2O + N_2$ The number and interaction of such reactions can be quite complex. However, by employing the recycling concept of the present invention the $NH_3$ and HCN are kept from excessively accumulating in the water scrubbing system. Upon steady-state operation, the amount of $NH_3$ or HCN which is oxidized, decomposed, or reduced from the recycled water will equate to the net rate at which $NH_3$ and HCN are absorbed in the scrubbing zone 28. Also, the dissolved salts, including compounds of the heavy metals and relatively stable compounds containing ammonia or hydrogen cyanide that do not leave the gasifier in gaseous or entrained form become associated with the ash or slag residue produced in the gasifier and are conveyed from the gasifier with the ash or slag residue by conduit 16 and are eventually disposed with the ash and slag residue conveyed by conduit 20. These compounds may be decomposition, oxidation or reduction products of the compounds in the foul aqueous effluent and/or dissolved solids in the recycled foul aqueous effluent. The dissolved solids, upon flash evaporation of the recycled foul aqueous effluent in the gasifier, will be predominantly deposited on the surface of the residue in the gasifier. The association of these compounds with the ash or slag is in such a manner that once the slag and ash are disposed of from the gasification process, these compounds will, if at all, only negligibly leach from the ash or slag. Stable sulfur-containing compounds, such as sulfates, are also deposited on the residue surface upon flash evaporation of water in the gasifier. Sulfur contained in unstable compounds present in the recycle water will be largely converted to $H_2S$ or COS under the reducing conditions of the gasifier. This $H_2S$ or COS can be removed from the particulate-free gas by well-known technology.

DESCRIPTION OF THE PREFERRED EMBODIMENT

For a better understanding of the present invention, its objects and advantages, reference should be had to the following description of the preferred embodiment of the present invention and to the accompanying FIG. 2 which illustrates schematically the preferred embodiment. In FIG. 2, the drawing of the preferred embodiment of the present invention is illustrated in connection with this application to a process for gasifying carbonaceous materials by a gasification process wherein the carbonaceous feed is entrained or suspended in the gasifying medium of oxygen and the residue produced in the gasifier is removed by molten slagging, which means the residue is a molten ash.

In the preferred embodiment of the present invention, the gasification process used would ordinarily be one which operates at high temperature, such as the well-known Koppers-Totzek process. This process involves the high temperature (2500°–3500° F.) gasification of a carbonaceous fuel with oxygen and an additional gasification agent, which is usually steam. The high temperature gasification process avoids the generation of tars or other distillation products from the carbonaceous fuel. The portion of the ash contained in the carbonaceous feed is recovered as molten slag in the case of high temperature gasification processes.

The preferred carbonaceous material fed into the gasifier by conduit 62 is coal. In FIG. 2, the circuit designated by conduit 130, zone 104, conduit 108, clarifier 106, conduit 118 and that portion of indirect cooler 90 through which the foul aqueous effluent flows, is referred to as the gas cooling and cleaning circuit.

Depending upon the rank of the coal, the coal is dried to between about 1 percent and about 8 percent moisture and pulverized to around 70 percent minus 200 mesh. Roller or ball type "windswept" pulverizing mills are used for pulverization and simultaneous drying of the coal before it is fed to the gasifier. Pulverizers are designed to use 800° to 900° F. (427° C. to 482° C.) combustion gases for a drying medium so the coal particle temperature never exceeds a temperature of around 180° F. (82.2° C.). At this temperature, there is no devolatilization or chemical reaction of the coal particles.

The pulverized coal is conveyed with nitrogen from storage and then metered into the gasifier via conduit 62. The pulverized coal is continuously discharged from conduit 62 into a mixing nozzle of the gasifier where it is entrained in oxygen. The mixture is then delivered through a transfer pipe into the burner area of the gasifier. Oxygen is conveyed to the gasifier by conduit 64. The oxygen is discharged to the mixing nozzle to be used as an entraining medium for the coal entering the burner area of the gasifier.

A portion of the oxygen in conduit 64 is taken off by conduit 66 and conveyed to an ozone generator 68. The portion of oxygen diverted from conduit 64 can be any portion, but is preferably an amount of about 5 percent of the oxygen conveyed by conduit 64. The ozone generator may be any apparatus known to those skilled in the art to be useful in the generation of ozone. The ozone is usually generated by the process known to those skilled in the art of passing oxygen through an electrical corona discharge. Usually, only a portion of the oxygen in conduit 66 is conveyed to the ozone generator 68. The remaining portion bypasses the ozone generator by conduit 70 in order to be mixed with the ozone emanating from the ozone generator in conduit 72. This is done to provide some control of the ozone concentration in the resulting mixture of oxygen and ozone. The mixture of ozone and oxygen is conveyed by conduit 72 to an oxidation and pretreatment tank 74 to treat the foul aqueous effluent produced by a later step in the process. This foul aqueous effluent contains ammonia and hydrogen cyanide, and compounds comprised of these gases, as well as some sulfur compounds as well as dissolved salts, including salts of heavy metals. This foul aqueous effluent is conveyed to the oxidation and pretreatment tank by conduit 142. Also, vent gases containing ammonia or hydrogen cyanide from other process steps in the overall gasification process may be introduced into the oxidation and pretreatment tank, for example, by conduit 76. In addition to the ozonation pretreatment of foul aqueous effluent, a lime pretreatment may be used. The ozonation pretreatment affords preoxidation or prepartial oxidation of ammonia and hydrogen cyanide, as well as the sulfur compounds present, and is utilized since ozone is more effective than oxygen in oxidizing cyanide compounds and ammonia compounds. The expected typical ammonia compounds, e.g., ammonium carbonate, $(NH_4)_2CO_3$, ammonia sulfate, $(NH_4)_2SO_4$, have low decomposition temperatures and are readily decomposed under gasifier conditions. Any ammonium chloride, $NH_4Cl$, present, if in significant amounts, may be treated by the additional embodiment, the lime treatment, wherein the ammonium chloride is converted to ammonia and calcium chloride. The ammonia gas so evolved would enter the gasifier whereupon it is oxidized, decomposed, or reduced. The calcium chloride, like other dissolved salts, will be deposited upon the residue surface within the gasifier.

The preoxidized foul aqueous effluent along with any free ozone, oxygen, water vapor, or released gases, such as ammonia, is removed from zone 74 by conduit 78 and is conveyed to an atomizer 80 where it is usually combined with a small portion of oxygen from conduit 66 conveyed to the atomizer by conduit 67. The oxygen conveyed by conduit 67 would be at sufficient pressure to provide a motive force necessary for atomization.

The atomizer may be any atomizer known to those skilled in the art to be used in the chemical processes. The atomized feed containing predominantly pretreated foul aqueous effluent and oxygen is conveyed from the atomizer to the gasifier by conduit 69 in such a manner that the water would avoid wetting the coal, and in such a manner that would permit periodic cleaning of the atomizer without shutting down the gasifier, and in such a manner to permit sufficient oxygen partial pressure in the vicinity of the atomized feed to promote more extensive oxidation of the ammonia, hydrogen cyanide, and any sulfur compounds contained in the foul aqueous effluent. In cases where ammonia or hydrogen are incompletely oxidized to oxides of nitrogen, the oxides of nitrogen so formed would eventually leave the oxidation zone of the gasifier flame and then pass to an area within the gasifier wherein sufficient hydrogen partial pressure would be available to reduce these oxides of nitrogen to elemental nitrogen and water. The amount of water actually added to the gasifier from the foul aqueous effluent is at a rate of about 0.1 to about 0.6 lb./lb. of coal, and is typically around 0.3 lbs. per pound of coal.

In the gasifier, exothermic oxidation reactions produce a flame temperature of approximately 3500° F. (1927° C.). Gasification of the coal is almost complete and instantaneous. Endothermic reactions occurring in the gasifier between carbon and the water added in the atomized feed and radiation of heat to the refractory walls substantially reduce the flame temperature from 3500° F. (1927° C.) to a gasifier exit temperature of about 2700° F. (1482° C.). The gasifier is usually cooled by the use of a gasifier jacket surrounding the refractory lining. The use of the foul aqueous effluent introduced to the gasifier from the atomized feed replaces the use of steam, or other known entraining media, such as $CO_2$, in prior practice with such a gasification process. Under gasifier conditions, the ammonia, hydrogen cyanide, and compounds containing these gases, and any sulfur compounds oxidize, decompose or are reduced to nitrogen, water, carbon dioxide, carbon monoxide and hydrogen. The gaseous products of these reactions can leave the gasifier with the raw gas while the solid products of these reactions, i.e., stable salts, leave the gasifier with the molten slag.

Ash in the coal feed is liquefied at the high reaction temperature and approximately 30 to about 70 percent of the molten slag drops out of the gasifier into the slag quench tank 84 by drop leg conduit 82. Within the gasifier, the molten slag resides on the inner surface of the gasifier and flows by gravity to conduit 82. Thus, a continuous surface of molten slag is available for collecting the solid products which result upon introduction of the foul aqueous effluent to the gasifier. Processing water is introduced into a slag quench tank by conduit 86 to cool the slag and to fuse (solidify) the slag. The flow of water in the vicinity of the interface between the contents of the gasifier and the slag quench tank is adjusted to insure a sufficient yet not excessive flow of vaporized water rising from the small interface into the gasifier. This vaporized water is readily generated in view of direct contact to molten slag with the water in the slag quench tank. A water vapor film prevents direct contact of the water in the slag quench tank with gas generated inside the gasifier. Thus, water in the slag quench tank contains negligible dissolved gases. The hot water is removed from the slag quench tank by conduit 88 and conducted to an indirect cooler 90 wherein the hot water is cooled and returned via conduit 86 to cool molten slag introduced into the slag quench tank. The molten slag, which contains the dissolved salts or solid reaction products from the foul aqueous effluent, is recovered for disposal as a granular solid with a top size ranging from about ⅛ inch to about 6 inches wherein the compounds are trapped and therefore do not have a tendency to leach from the solid. This represents an extremely sound and inexpensive means of handling these compounds from an environmental standpoint. The cooled slag is removed from the slag quench tank via conduit 92 and conveyed to disposal.

Prior to disposal, the fused slag may be washed with fresh makeup water, if desired, with the resulting wash liquor returned to the gas cooling and cleaning circuit. This insures that the very small amount of leachable materials will not contaminate the slag disposal area.

The remainder of the slag and most of the unreacted carbon are entrained in the gas exiting the gasifier. Water sprays quench the gas to drop the temperature below the ash fusion temperature to prevent slag particles from adhering to the tubes of the waste heat boiler mounted atop the gasifier. The raw gas from the gasifier is conveyed to a waste heat boiler 94, called steam generator, by conduit 96 after the raw gas is sprayed with water by a stream 98. Alternatively, cooled recycle gas may replace water conveyed by conduit 98. The waste heat boiler produces high pressure steam up to about 1500 psig, which can be used in other steps of the gasification process. Any dry fly ash accumulated in this steam generator is conveyed to the slag quench tank by conduit 100. The dry fly ash will then be disposed of with the slag from the gasifier. Alternatively, the dry fly ash conveyed by conduit 100 could be disposed as a separate stream.

After leaving the waste heat boiler, the gas that is at a temperature of around 350° F. (177° C.) is delivered by conduit 102 to the particulate scrubbing and removal zone 104 wherein the gas is cleaned and simultaneously cooled. The system preferably consists of a fixed orifice venturi type scrubber for removing the largest particles followed by a variable orifice venturi type scrubber where the remaining particles are removed. Following the scrubbing, the gas is cooled with water to about 95° F. (35° C.) in a packed cooler. Although this system is preferred, any other gas cooling and cleaning system may be employed, as long as all necessary removal of heat is conducted indirectly.

Particle-laden water from the gas cleaning and cooling system is conveyed to clarifier 106. This particle-laden water is the foul aqueous effluent from the particulate scrubbing and removal zone and contains, in addition to suspended particles of carbon and ash, ammonia, hydrogen cyanide, salts including those of heavy metals, and compounds thereof, including sulfur compounds, that are soluble in water and appear as dissolved gases or chemical compounds within the foul aqueous effluent.

Clean cool gas leaving the particulate scrubbing and removal zone by conduit 110 is compressed, if necessary, and conveyed to an acid gas removal system (not shown in FIG. 2) for the removal of sulfur compounds by known methods and to produce a synthesis gas useful as a reducing gas or useful in chemical processes as a reactant, or to produce a high Btu synthetic gas by treating it in a methanation process.

The foul aqueous effluent conveyed to the clarifier by conduit 108 has most of the particles removed by gravity in the clarifier. The particles form a sludge which is pumped from the clarifier either to a filter 112 by conduit 114 or, alternatively, to a disposal area (not shown in FIG. 2). Any filtrate collected from the filter is returned to the clarifier by conduit 116. Resulting filter cake may be continuously washed with fresh water to ensure that surface moisture which accompanies the disposed filter cake is free of contaminants. Wash liquor from the filter cake enters conduit 116 for return to the process.

Clarified foul aqueous effluent leaves the clarifier by conduit 118. A portion of this clarified foul aqueous effluent is diverted from conduit 118 by conduit 120 for recycle back to gasifier 60. The remaining portion of the clarified foul aqueous effluent is conveyed by conduit 118 to indirect cooler 90 where this effluent is cooled without directly contacting water used to quench the slag removed from the gasifier and without coming into direct contact with the atmosphere. Water is supplied to the indirect cooler by conduit 122 which cools both the foul aqueous effluent of the gas cooling and cleaning circuit and the water from the slag quench tank in conduit 88. The hot water removed from the indirect cooler after cooling the aqueous effluent and after cooling the water for the slag quench tank is removed from the indirect cooler by conduit 124 and is conveyed to cooling tower 126 where it is cooled through water evaporation by contacting the atmosphere, but where hydrogen cyanide, ammonia, heavy metals and compounds containing them and sulfur compounds are absent and are not released to the environment. Any needed makeup water for the cooling tower to compensate for water lost by evaporation is added to the system by conduit 128. Alternatively, the cooling tower 126 can be eliminated or reduced in size, with a subsequent savings in makeup water required, by replacing the cooling water conveyed to the indirect cooler 90 with a forced draft of ambient air. This air would enter and leave the indirect cooler by conduits 122 and 124, respectively. The air leaving the indirect cooler would not be contaminated.

The cooled clarified foul effluent is removed from the indirect cooler by conduit 130. A portion of this cooled effluent is diverted from conduit 130 by conduit 132 and is split into two streams, conduit 98 and conduit 133, for concentration of dissolved solids followed by combination with the aqueous effluent in conduit 120, then for recycle to the gasifier. The remaining portion of the aqueous effluent in conduit 130 is conveyed by conduit 98 to conduit 96 for cooling the raw gas by water spray. The total amount of effluent to be recycled to the gasifier from conduit 120 and conduit 132 is equal to the excess water resulting from the condensation of water vapor during gas cooling and scrubbing in the particulate scrubbing and removal zone 104. More precisely, the water recycled to the gasifier equates to the net amount of water condensed from the raw gas plus any amounts of fresh water added to the system, e.g., that which may be used to wash filter cake leaving filter 112, less extraneous water losses, such as that which accompanies the filter cake sent to disposal. In addition, any condensate obtained from the gas during further processing, for example, compression, may also be combined with the recycled water. The preferred amount of foul aqueous effluent recycled and atomized into the gasifier is around 0.3 pounds per pound of coal. This amount of foul aqueous effluent should not exceed around 0.8 pounds per pound of coal since adding this increased quantity of water would harm gasifier efficiency. This loss in efficiency would be that heat otherwise available for endothermic reactions within the gasifier which would be wasted in overcoming the additional latent heat of vaporization of the water. The amount of foul aqueous effluent recycled to the gasifier can be any amount below around 0.3 pounds per pound of coal, but any amount less than about 0.3 typically, depending on the type of coal, would not maximize the reduction of foul aqueous effluent from the gasification process.

That portion of cooled clarified foul aqueous effluent in conduit 130 that is not diverted by conduit 132 for recycle to the gasifier continues in conduit 130 along with any fresh makeup water added via conduit 148 and is conveyed to the particulate scrubbing and removal zone 104 to cool and clean the raw gas.

The portion of cooled clarified foul aqueous effluent in conduit 132 which is intended for recycle to the gasifier is conveyed to a reverse osmosis pretreatment zone 134. The reverse osmosis pretreatment zone may be required if the foul aqueous effluent may damage a reverse osmosis unit or when it is desired to increase the capacity of the reverse osmosis unit. The pretreatment may consist of adjusting the temperature of the foul aqueous effluent, adjusting pH, reducing chlorine content, reducing organics content, or adjusting iron and manganese content. The pretreated effluent is removed by conduit 136 from the reverse osmosis pretreatment zone 134 and conveyed to the reverse osmosis unit 138.

Reverse osmosis is where a pressure greater than the osmotic pressure is applied to the diluted side of a permeable or semi-permeable membrane, resulting in water being moved from contaminated water to less contaminated water while leaving dissolved solids behind in a concentrate. In the reverse osmosis unit, dissolved solids in the effluent conveyed by conduit 136 are concentrated by transferring water from the foul aqueous effluent to a stream of appropriately treated fresh water which is also sent to the reverse osmosis unit. Water which is transferred from the effluent to the fresh water then enters, along with the fresh water via conduit 150, into the raw gas cooling and cleaning circuit by conduit 139. The reverse osmosis unit is used only when the amount of water which is recycled to the gasifier is not of sufficient rate to remove dissolved solids from the raw gas cooling and cleaning circuit. Dissolved solids can enter the circuit as a result of leaching small amounts of soluble materials from the coal ash which is entrained with the raw gas. Such accumulation, if not prevented, will result in scaling or corrosion of equipment. The amount of water processed through the reverse osmosis unit will ordinarily range from about 0 to about 30 percent of the total foul aqueous effluent which is recycled to the gasifier. The dissolved solids are removed from the gas cooling and cleaning circuit upon evaporation of the foul aqueous effluent within the gasifier whereby they collect upon the molten slag surface and enter the slag quench tank, and eventually they are disposed with the slag. Under steady-state conditions there will be no net accumulation of dissolved solids. The foul aqueous effluent leaving the reverse osmosis unit by conduit 140 is combined with the portion of foul aqueous effluent in conduit 120 and both are conveyed by conduit 142 to the oxidation and pretreatment tank 74 for atomization and introduction into the gasifier. Makeup water may be added to the reverse osmosis unit and to the entire process, through conduits 144 and 146, and conduits 144 and 148, respectively, by conduit 144. The reverse osmosis unit and reverse osmosis pretreatment zone may be any vessels or pieces of equipment known to those skilled in the art to be useful in reverse osmosis pretreatment processes and reverse osmosis processes. An example of a reverse osmosis unit that can be used with the present invention is the AMF Cuno Reverse Osmosis Units available from AMF Incorporated, Meriden, Connecticut. Alternatively, a partial evaporation step may be used in lieu of a reverse osmosis unit as a means of concentrating dissolved solids from the gas cooling and cleaning system. However, the reverse osmosis method is preferred from an efficiency and cost standpoint.

The foregoing has described a process for use in gasification processes for carbonaceous materials to eliminate or to minimize the amount of ammonia, hydrogen cyanide, compounds thereof, and dissolved salts including those comprised of heavy metals, and sulfur compounds being released to the environment in aqueous effluents, and to reduce or to replace the need for steam in the gasifier, while not imparing the efficiency of the gasifier.

I claim:

1. A process for reducing the quantity of foul aqueous effluent containing ammonia or hydrogen cyanide, or compounds thereof, or sulfur compounds or salts or compounds of heavy metals discharged from a slagging-type gasification process for carbonaceous material where oxygen or oxygen-containing gas is used as the gasifying medium to produce a raw gas containing mostly carbon monoxide and hydrogen and a residue slag where the raw gas is treated after it leaves the gasifier with an aqueous stream to remove particulates from the raw gas and to cool the raw gas, comprising:

(a) clarifying the aqueous stream after it has been used to remove particulates from the raw gas and to cool the raw gas after which it is a foul aqueous effluent containing ammonia, hydrogen, cyanide, compounds thereof, compounds of sulfur, or salts and compounds of heavy metals or mixtures thereof, and particulates of carbon to remove the particulates;
    (b) cooling the foul aqueous effluent;
    (c) splitting the cooled clarified foul aqueous effluent into two portions wherein said first portion is about equal to the net amount of water condensed from the raw gas plus any amounts of fresh water added to the gasification process, and wherein the second portion is the remaining amount of foul aqueous effluent;
    (d) treating the first portion of foul aqueous effluent by reverse osmosis to concentrate any dissolved compounds or salts of ammonia, hydrogen cyanide, sulfur, or heavy metal or mixtures thereof;
    (e) pretreating the concentrated foul aqueous effluent by ozonation to enhance oxidation of ammonia, hydrogen cyanide, compounds thereof, sulfur compounds, or salts and compounds of heavy metals or mixtures thereof in the gasifier;
    (f) recycling the pretreated, concentrated foul aqueous effluent to the gasifier in an amount not exceeding 0.8 pounds per pound of carbonaceous material whereby the ammonia, hydrogen cyanide or compounds and mixtures thereof are transformed into environmentally innocuous gaseous compounds while simultaneously the dissolved compounds of ammonia, hydrogen cyanide, sulfur and heavy metals or mixtures thereof are recovered from the gasifier in an environmentally acceptable form with the residue from the gasifier, and sulfur compounds are transformed into gaseous compounds that can be recovered with gaseous sulfur compounds usually present in the raw gas from the gasifier, said recycled pretreated foul aqueous effluent being atomized with a portion of the oxygen used for entrainment of the carbonaceous material conveyed into the gasifier;
    (g) recycling the second portion of cooled clarified foul aqueous effluent to the aqueous stream used to remove particulates from the raw gas and to cool the raw gas.

2. A process according to claim 1 wherein the carbonaceous material is coal.

3. A process according to claim 1 wherein the first portion of foul aqueous effluent is split and only a portion of the foul aqueous effluent is treated by reverse osmosis to concentrate any dissolved compounds or salts present in the effluent and is than recombined with the portion of foul aqueous effluent not treated by reverse osmosis for pretreating by ozonation.

4. Process according to claim 1 wherein the foul aqueous effluent recycled to the gasifier is pretreated with a lime treatment before introduction into the gasifier.

* * * * *